United States Patent [19]

Cline

[11] 4,106,568

[45] Aug. 15, 1978

[54] CHISEL PLOW WITH ADJUSTABLE TOWING TONGUE AND GAUGE WHEELS

[76] Inventor: Ted L. Cline, Box 37, Rush Springs, Okla. 73082

[21] Appl. No.: 746,697

[22] Filed: Dec. 2, 1976

[51] Int. Cl.² .................... A01B 13/08; A01B 63/22

[52] U.S. Cl. .................... 172/327; 172/396; 172/413; 172/421; 172/690; 172/699; 280/43.23

[58] Field of Search ............ 172/326, 327, 328, 396, 172/400, 413, 421, 427, 467, 478, 482, 491, 675, 680, 690, 699, 700; 280/43.2, 43.23

[56] References Cited

U.S. PATENT DOCUMENTS

| 1,969,684 | 8/1934 | Bird | 172/413 |
|---|---|---|---|
| 2,691,930 | 10/1954 | Forgy | 172/328 |
| 2,739,396 | 3/1956 | Frenzel | 172/327 |
| 2,939,539 | 6/1960 | Kramer | 172/400 X |
| 3,559,747 | 2/1971 | Cline | 172/421 |

FOREIGN PATENT DOCUMENTS

| 868,234 | 2/1953 | Fed. Rep. of Germany | 172/690 |

*Primary Examiner*—Richard T. Stouffer
*Attorney, Agent, or Firm*—William R. Laney

[57] ABSTRACT

A plow for chiselling the earth at substantial depths, including a framework having a plurality of arcuate chisel blades mounted thereon. A towing tongue is pivotally connected to the forward side of the framework, and a hydraulic piston and cylinder system is connected between the towing tongue and the framework for pivoting the framework between a position of coplanar alignment with the towing tongue, and positions in which the framework is angulated with respect to the plane of the towing tongue. Gauge wheels are pivotally mounted on the framework for selective elevation in relation to the blades, and a hydraulic system is provided for selectively elevating and lowering the gauge wheels by pivotation on the framework. The hydraudlic system for the gauge wheels includes a transversely extending tubular control member mounted on the framework for the plow forwardly of the gauge wheels. Each gauge wheel is connected with the control member by a turnbuckle subassembly.

12 Claims, 4 Drawing Figures

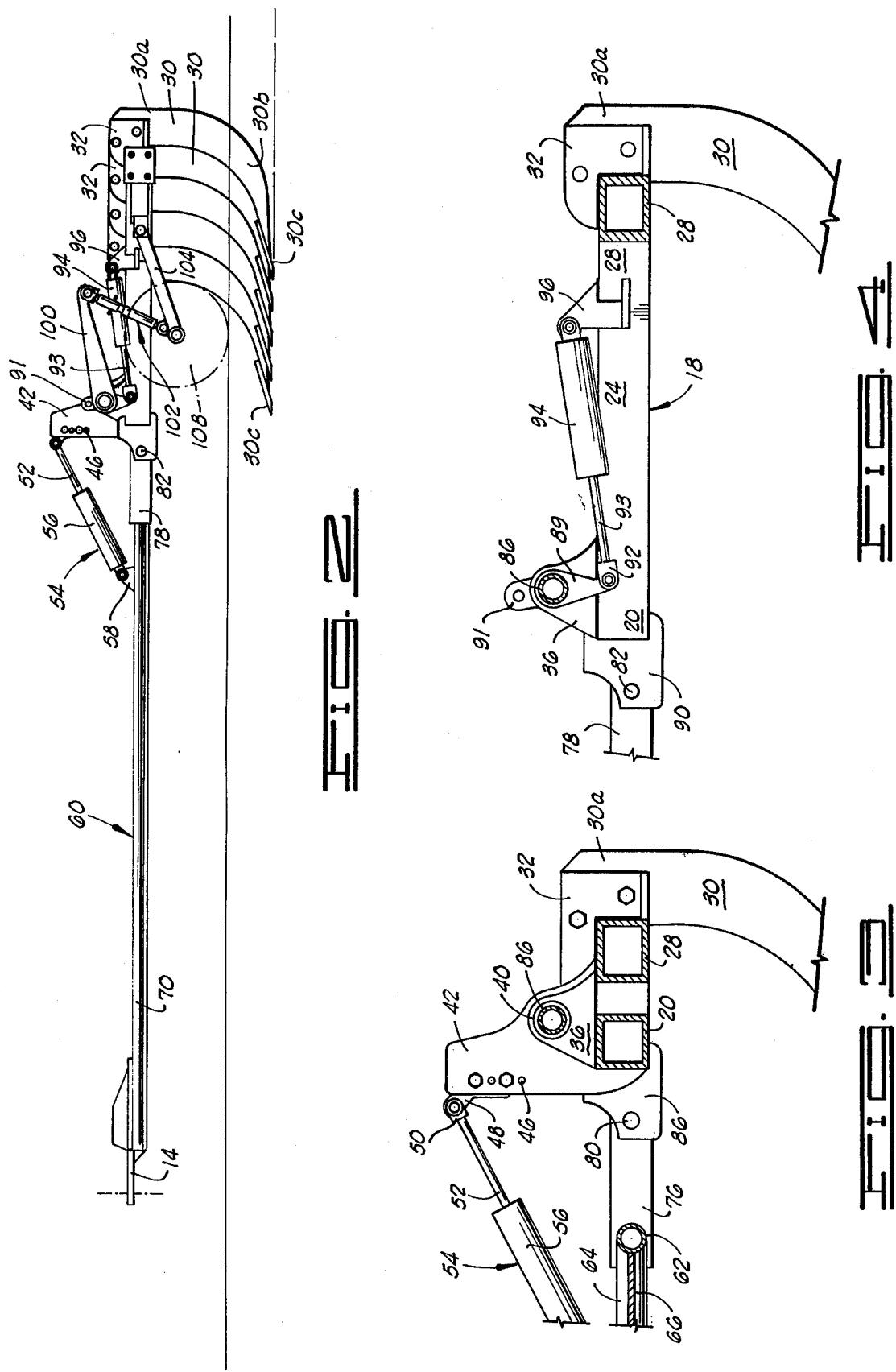

CHISEL PLOW WITH ADJUSTABLE TOWING TONGUE AND GAUGE WHEELS

BACKGROUND OF THE INVENTION

1. Field of the Invention

This invention relates to subsoil chisel plows which include a plurality of chisel blades, and more particularly, to chisel plows of the type described which are adapted for towing behind an agricultural tractor by means of a towing tongue connected to a single central towing point at the rear of the tractor.

2. Brief Description of the Prior Art

With the advent in the last 20 years of high-powered agricultural tractors, improvements in plows which facilitate plowing to a greater depth have been made, since such plows can generally be effectively pulled by tractors of relatively greater horsepower. One form of plow which has been used for the purpose of deep plowing has been a type which has been referred to as a chisel or subsoiler plow. Such plows usually include a plurality of transversely spaced chisel blades which are relatively thin arcuate blade members curving to a forwardly projecting point at the lower end thereof, and capable of chiselling or wedging deeply into the earth so as to break through the plow pan layer and penetrate to the moister earth frequently located below the hard plow pan layer present in some soils. One type of such subsoiler chisel plow which has been especially effective is that which is shown and described in U.S. Pat. No. 3,450,212.

Many of the subsoiler chisel plows heretofore proposed are constructed for attachment to three-point hitch type agricultural tractors through linkages which connect to the plow frame at three laterally spaced points. Control of these plows can be more easily obtained by reason of the hydraulic system of the tractor permitting elevation and more selective control through the three-point linkage. Often such plows have been provided with gauge wheels, which are ground-engaging wheels mounted on the blade-carrying framework of the plow, and adjustable in their vertical relationship to the blades so as to control the depth of the soil to which the blades will penetrate during use of the plow.

BRIEF DESCRIPTION OF THE PRESENT INVENTION

The present invention comprises an improved chisel plow which is constructed to be towed behind a tractor by the use of a towing tongue or linkage which connects to the tractor at only a single point at the rear thereof. The plow is constructed to facilitate hydraulic positional control by the tractor operator in such way that the angulation of the blade-carrying framework of the plow can be altered in relation to the surface of the earth, and to the plane of the towing tongue. The plow construction also facilitates the selective hydraulic control of the position of the gauge wheels in relation to the plow blades by the operator of the tractor.

Broadly described, the plow of the invention includes a framework which has secured thereto a plurality of downwardly projecting, arcuate chisel blades. A towing tongue is pivotally connected to the central forward portion of the framework, and is adapted for attachment to an agricultural tractor for towing therebehind. A hydraulic piston and cylinder system is connected between the towing tongue and the plow framework to pivot the framework between a position of coplanar alignment with the towing tongue, and alternate positions in which the framework is angulated with respect to the plane of the towing tongue. Gauge wheels are pivotally mounted on the framework for selective elevation in relation to the blades, and a hydraulic system is provided for effecting such elevation through the control of an operator seated on the tractor.

An important object of the invention is to provide an improved subsoil chisel plow susceptible to towing behind an agricultural tractor from a single point of connection thereto, and which affords selective control, from the tractor, of the angle of attack of the several chisel blades of the plow in respect to the earth.

Another object of the invention is to provide a subsoil chisel plow in which both the gauge wheels carried at opposite ends of the plow frame, and a towing tongue pivotally connected to the forward side of the frame, can be pivotally moved in relation to the frame and to the blades carried thereby to effectively control the depth of penetration of the blades and their orientation in relation to the ground, as well as the orientation of the frame of the plow in relation to the towing tongue.

A further object of the invention is to provide an improved subsoil chisel plow which is mechanically sturdy in its construction, and is characterized in having a long and trouble-free operating life.

Additional objects and advantages of the invention will become apparent as the following detailed description of the invention is read in conjunction with the accompanying drawings which illustrate the invention.

GENERAL DESCRIPTION OF THE DRAWINGS

FIG. 2 is a side elevation view of the subsoil chisel plow of the invention.

FIG. 3 is a sectional view taken along line 3—3 of FIG. 2.

FIG. 4 is a sectional view taken along line 4—4 of FIG. 1.

DETAILED DESCRIPTION OF A PREFERRED EMBODIMENT OF THE INVENTION

Figure 1:
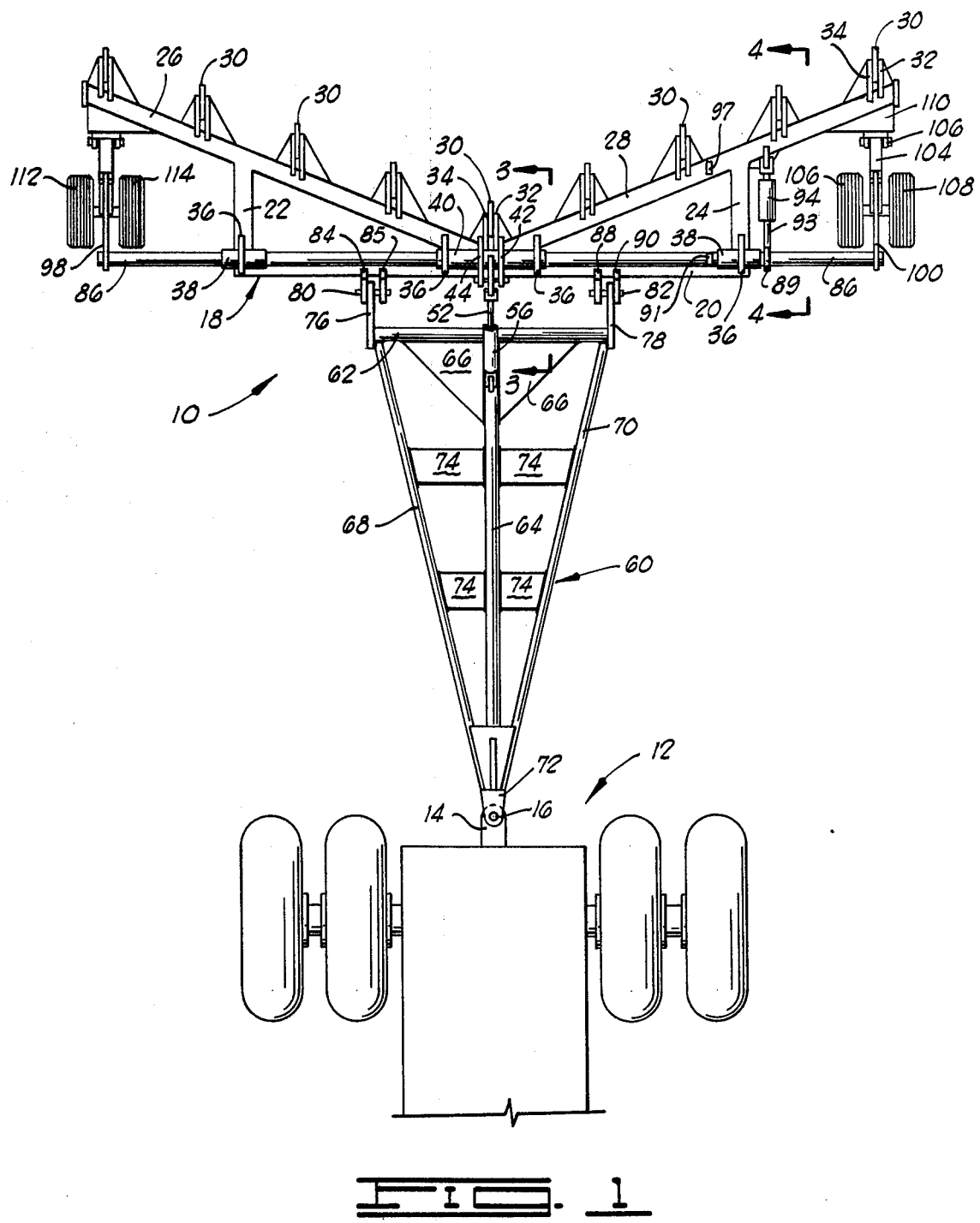
FIG. 1 is a plan view of the subsoil chisel plow of the invention as it appears when connected to an agricultural tractor.

Referring initially to FIG. 1 of the drawings, the subsoil chisel plow of the invention is shown therein and is designated generally by reference numeral 10. The plow 10 includes a towing tongue or boom subassembly, hereinafter described, by which it is connected to an agricultural tractor, schematically illustrated and designated generally by reference numeral 12. It will be noted that the towing boom subassembly is connected to a towing plate 14 (or drawbar) of the tractor by means of a single connecting or hitch pin 16.

The plow 10 includes a framework 18 which has a forward, transversely extending frame bar 20 interconnected by rearwardly extending frame bars 22 and 24 to a pair of blade-supporting frame bars 26 and 28. The blade-supporting frame bars 26 and 28 have convergent inner ends, and are angled with respect to each other to form a V. At their inner ends at the central portion of the frame, the frame bars 26 and 28 have their ends welded to each other and to the rear side of the transverse frame bar 20. The angulation of the frame bars 26 and 28 with respect to each other is such that these elements of the framework 18 define an obtuse angle of from about 120° to 150°.

The frame bars 26 and 28 each carry a plurality of spaced, arcuate chisel blades 30. Each of the chisel blades includes an upper shank portion 30a, a lower shank portion 30b, and a replaceable point 30c detachably secured to the upper side of the lower forward end of each chisel blade. The upper shank portion 30a of each of the arcuate chisel blades 30 is secured by bolting between a pair of spaced, parallel mounting plates 32 and 34 which are welded to the respective frame bar 26 or 28, and project rearwardly therefrom to define the space receiving the upper shank portion of each blade. It will be noted that the chisel blades 30, in being mounted on the frame bars 26 and 28 in the manner described, also define a V configuration in their collective array. One of the chisel blades 30 is also secured between a pair of spaced, parallel mounting plates 32 and 34 disposed at the central portion of the frame where the frame bars 26 and 28 intersect.

Mounted on the forward transversely extending frame bar 20 are a plurality of journal brackets 36 which project upwardly from this frame bar, and rigidly support elongated cylindrical journal sleeves. Thus, the journal brackets 36 at the outer or opposed ends of the frame bar 20 carry journal sleeves 38, and the journal brackets 36 near the central portion of the frame bar 20 carry a journal sleeve 40. It will further be noted in referring to FIG. 3 that the central journal brackets 36 are also in part supported by, and are secured by welding to, the frame bars 26 and 28 at locations near the point of convergence of these latter bars at the center of the framework 18.

At the center of the framework 18 and positioned between the two innermost journal brackets 36 are a pair of upwardly projecting, spaced lever plates 42 and 44. The lever plate 42 has its lower end welded to the front and upper side of the forward, transversely extending frame bar 20 and also has a rearwardly extending portion thereof welded to the sleeve 40 and to the upper side of the frame bar 28. The lever plate 44 is similarly secured to both the frame bar 20, the sleeve 40 and the frame bar 26. The lever plates 42 and 44 have a plurality of spaced, aligned openings 46 formed therethrough to facilitate the adjustable securement between the lever plates of a connecting bracket 48 (see FIG. 3).

The connecting bracket 48 has a tongue portion which projects toward the tractor 12 and carries an aperture at its forward upper end. The aperture permits a clevis bracket 50 carried on the outer end of an extensible piston rod 52 to be pivotally pinned to the connecting bracket 48. The piston rod 52 forms a portion of a hydraulic piston and cylinder subassembly designated generally by reference numeral 54. The piston and cylinder subassembly 54 also includes a cylinder 54 which is pivotally connected through a suitable bracket 58 to the towing tongue or towing boom subassembly designated generally by reference numeral 60.

The towing boom subassembly 60 includes a transversely extending frame element 62 and a central longitudinal frame element 64 connected at its rear end to the central portion of the frame element 62, and reinforced in such connection by a pair of gusset plates 66. The bracket 58 is welded to the upper side of the central longitudinally extending frame member 64 at a point forward of its point of securement to the frame element 62. At the outer sides of the towing tongue subassembly 60, a pair of forwardly converging outer frame elements 68 and 70 are provided, and converge at their forward ends at a location at which they are welded to each other, and to a towing plate 72. The towing plate 72 is apertured to permit the hitch pin 16 to be employed for connecting the towing plate 72 to the towing plate 14 or to a drawbar carried at the central portion of the rear side of the tractor 12. Reinforcement of the towing tongue subassembly 60 is provided by the extension of a plurality of transverse reinforcing plates 74 between the central, longitudinally extending frame element 64 and the convergent outer frame elements 68 and 70.

A pair of pivot plates 76 and 78 are secured to the outer ends of the transverse frame element 62, and project rearwardly in parallel relation to each other. The pivot plates 76 and 78 facilitate pivotal attachment of the towing tongue subassembly 60 to the framework 18. Pivotal attachment of the pivot plates 76 and 78 to the framework is achieved by extending pivot pins 80 and 82 through aligned apertures formed in pairs of bracket plates secured to the forward side of the frame bar 20. Thus, the pivot pin 80 is projected through apertured bracket plates 85 and 86, and through an aligned aperture in the rear end of the pivot plate 76. The pivot plate 78 is pivotally connected by means of the pin 82 projecting through an aperture in the rear end thereof, and through the apertured bracket plates 88 and 90 secured to the forward side of the frame bar 20.

An elongated tubular control member or shaft 86 extends completely across the plow 10 in a transverse direction and is rotatably journaled in the sleeves 38 and 40 so as to extend parallel to, and be located above, the transverse frame bar 20. The tubular member 86 has secured thereto, at a point just outside the sleeve 38, a downwardly projecting crank arm 89 as shown in FIG. 4. A second crank arm 91 is secured to, and projects upwardly from, the tubular control member 86 at a location on the opposite side of the sleeve 38 from the crank arm 89 thereby preventing longitudinal movement of the tubular control member 86 through sleeve 38. The crank arm 89 carries an aperture in its lower end which permits a clevis 92 to be pinned thereto in order to permit a piston rod 93 carrying the clevis to be employed in rotating the elongated tubular member 86 about its longitudinal axis. The piston rod 93 is extensible from a hydraulic cylinder 94 which is pivotally connected to a cylinder-connecting bracket 96 welded or otherwise suitably secured to the upper and forward side of the frame bar 28 as shown in FIG. 4. A second cylinder-connecting bracket 97 is also secured to the upper side of the frame bar 28 and is spaced inwardly from the bracket 96 and positioned directly behind the crank arm 91. The hydraulic actuating means constituted by the cylinder 94 and the piston rod 93 is utilized to rotate the elongated tubular member 86 in the sleeves 38 and 40 in which this tubular member is rotatably journaled. The purpose of such a rotative movement will be hereinafter explained.

At the opposed outer ends of the elongated tubular member 86, a pair of rearwardly extending bell crank lever arms 98 and 100 are secured to the tubular member for rotation therewith. The bell crank lever arm 100 has a turnbuckle subassembly 102 pivotally connected to the rear end thereof. The lower end of the turnbuckle subassembly 102 is pivotally connected to a gauge wheel supporting arm 104 which has its opposite ends pivotally connected to an axle interconnecting a pair of ground-engaging gauge wheels 106 and 108 and its opposite end pivotally connected to a gauge wheel mounting bracket which is secured to the outer end of the frame bar 28 by means of suitable gusset plates 110.

A similar turnbuckle subassembly and gauge wheel supporting arm are employed for pivotally supporting a pair gauge wheels 112 and 114 on the opposite end of the framework 18 and for interconnecting the gauge wheels to the bell crank lever arm 98 hereinbefore described.

OPERATION

In the operation of the subsoil chisel plow of the invention, the manipulation and utilization of the plow 10 is controlled entirely from the tractor by the tractor operator. The plow may be placed in an over-the-road transport status by hydraulically retracting the piston rod 52 of the piston and cylinder subassembly 54 to cause the plow framework 18 to swing upwardly about a pivotal axis defined by the pivot pins 80 and 82. Concurrently, the piston rod 93 can be extended from the hydraulic cylinder 94 so as to pivot the bell crank lever arm 100 downwardly and thereby cause the gauge wheels 106, 108, 112 and 114 to be swung donwardly in relation to the chisel blades 30. The total effect of these two movements of the mechanism is to elevate the chisel blades 30 in relation to the ground and in relation to the gauge wheels, so that the chisel blades will clear the earth while the gauge wheels are in rolling contact with the ground to permit transport. It is to be noted that when the piston rod 93 is hydraulically extended from the cylinder 94, a clockwise rotation of the control shaft or bar 86 is effected which causes a concomitant clockwise pivotal movement of the bell crank lever arms 98 and 100. There is thus effected a concurrent pivotal movement in equal degree by the gauge wheels.

For the purpose of plowing, the piston rod 52 of the piston and cylinder subassembly 54 is extended so as to pivot the plow framework 18 downwardly about the horizontal pivotal axis defined by the pivot pins 80 and 82. The plow framework 18 can thus be brought into horizontal alignment with the towing boom subassembly 60 or, if desired, can even be extended through the plane of horizontal alignment to a point where the framework 18 is angled downwardly with respect to the towing boom subassembly. It is then also possible to control the angulation of the chisel blades 30 in relation to both the vertical and horizontal so as to vary the angle of attack of the replaceable points 30c carried at the forward lower ends of the chisel blades. This is accomplished by extension or retraction of the piston rod 93 with respect to the cylinder 94 so as to cause appropriate rotation of the elongated, transversely extending control shaft or bar 86.

Although a preferred embodiment of the invention has been herein described in order to illustrate the basic and underlying principles of the invention, it will be understood that various changes and innovations in the described and illustrated structure can be effected without departure from the basic principles of the invention. Such changes and innovations are therefore deemed to be circumscribed by the spirit and scope of the invention, except as the same may be necessarily limited by the appended claims or reasonable equivalents thereof.

What is claimed is:

1. A chisel plow comprising:

a framework having a forward side and having a rear side and including:

a transversely extending frame bar at the forward side of said framework; and a pair of divergent blade-supporting frame bars secured to the rear side of said transversely extending frame bar at substantially the center thereof and angled to each other in a substantially horizontal plane to define a V in configuration, said bars each having an outer end disposed at one side of the framework;

a plurality of chisel blades mounted on said frame bars;

a towing tongue pivotally connected to the forward side of the frawework for pivotation about a horizontal axis;

means for hydraulically pivoting the tongue and framework relative to each other between a first position in which the framework is in coplanar alignment with the towing tongue, and other positions in which the framework is angulated with respect to the towing tongue whereby the angle at which said chisel blades penetrate the earth can be varied;

gauge wheels pivotally mounted on the divergent outer ends of said frame bars and and movable therewith in relation to the towing tongue;

an elongated, transversely extending control member mounted rotatably on the framework for rotation about a horizontal axis and extending transversely across the direction of travel of the plow when plowing;

crank means connected between said transversely extending control member and said gauge wheels for pivoting the gauge wheels on the framework when said transversely extending control member is rotated; and means for hydraulically rotating said transversely extending control member independently of hydraulically activated movement of the framework relative to said tongue.

2. A chisel plow as defined in claim 1 wherein said means for hydraulically rotating said transverse member comprises:

a crank arm secured to the transverse control member and projecting substantially normal to the axis thereof; and a piston and cylinder subassembly connected between the framework and said crank arm for pivoting the crank arm and rotating the transverse member when the piston rod of said piston and cylinder subassembly is extended and retracted.

3. A chisel plow as defined in claim 1 wherein said crank means comprises:

bell crank lever arms secured to the opposite ends of said transverse control member for rotation therewith and projecting normal to the axis of rotation of said transverse control member;

a turnbuckle subassembly connected to each of said bell crank levers; and a gauge wheel supporting arm connected to each of said turnbuckle subassemblies and each having an end connected to the gauge wheel axle and a second end pivotally connected to said framework.

4. A chisel plow as defined in claim 1 wherein said means for hydraulically pivoting the tongue and framework relative to each other comprises:

a pair of upwardly projecting, spaced lever plates secured to the central, forward portion of the framework; and a piston and cylinder subassembly connected between a point on said towing tongue forward of the framework, and the upper ends of said lever plates.

5. A chisel plow as defined in claim 1 and further characterized as including:
   a plurality of spaced journal brackets secured to the upper side of said transversely extending frame bar; and
   a plurality of journal sleeves carried by said journal brackets, and rotatably supporting said transversely extending control member.

6. A chisel plow as defined in claim 5 wherein said means for hydraulically rotating said transverse control member comprises:
   a pair of crank arms secured to the transverse control member at the opposite ends of one of said journal sleeves to prevent longitudinal movement of said transverse member through said journal sleeves;
   a pair of cylinder-connecting brackets mounted on one of said blade-supporting frame bars rearwardly from said crank arms; and
   a piston and cylinder subassembly connected between one of said cylinder-connecting brackets and one of said crank arms for pivoting said one crank arm and rotating the transverse control member when the piston rod of the piston and cylinder subassembly is extended and retracted.

7. A chisel plow as defined in claim 6 wherein said crank means comprises:
   bell crank lever arms secured to the opposite ends of said transverse control member for rotation therewith and projecting normal to the axis of rotation of said transverse control member;
   a turnbuckle subassembly connected to each of said bell crank levers; and
   a gauge wheel supporting arm connected to each of said turnbuckle subassemblies and each having an end connected to the gauge wheel axle, and a second end pivotally connected to said framework.

8. A chisel plow as defined in claim 7 wherein said means for hydraulically pivoting the tongue and framework relative to each other comprises:
   a pair of upwardly projecting, spaced lever plates secured to the central, forward portion of the framework; and
   a piston and cylinder subassembly connected between a point on said towing tongue forward of the framework and the upper ends of said lever plates.

9. A chisel plow as defined in claim 8 wherein said towing tongue comprises:
   a transversely extending frame element positioned forwardly of said framework and extending substantially parallel to said transversely extending control member;
   spaced, parallel pivot plates secured to opposite ends of said frame element and projecting from said frame element toward said transversely extending frame bar of said framework;
   means pivotally connecting said pivot plates to said transversely extending frame bar for pivotation about horizontal axes;
   a central longitudinal frame element having an end connected to the central portion of said transversely extending frame element and projecting normal thereto in a direction away from said framework;
   outer frame elements secured to the opposite ends of said transversely extending frame elements and having ends converging with the end of said longitudinal frame element opposite its end connected to the central portion of said transversely extending frame element; and
   a towing plate secured to the converged ends of said outer frame element and central longitudinal frame element.

10. A chisel plow as defined in claim 1 wherein said means for hydraulically rotating said transversely extending control member comprises:
    means preventing longitudinal movement of said transversely extending control member on said framework;
    crank arm means secured to the transverse control member;
    cylinder-connecting bracket means mounted on one of said blade-supporting frame bars rearwardly from said crank arm means; and
    a piston and cylinder subassembly connected between said cylinder-connecting bracket means and said crank arm means for pivoting said crank arm means and rotating the transverse control member when the piston rod of the piston and cylinder subassembly is extended and retracted.

11. A chisel plow comprising:
    a framework having a forward side and having a plurality of chisel blades mounted upon said framework;
    a towing tongue pivotally connected to the forward side of the framework for pivotation about a horizontal axis;
    means for hydraulically pivoting the tongue and framework relative to each other between a first position in which the framework is in coplanar alignment with the towing tongue, and other positions in which the framework is angulated with respect to the towing tongue;
    gauge wheels pivotally mounted on opposite ends of the framework and movable therewith in relation to the towing tongue;
    an elongated, transversely extending control member mounted rotatably on the framework for rotation about a horizontal axis and extending transversely across the direction of travel of the plow when plowing;
    bell crank lever arms secured to the opposite ends of said transverse control member rotation therewith and projecting substantially normal to the axis of rotation of said transversely extending control member;
    a pair of turnbuckle subassemblies each having a first end pivotally connected to one of said bell crank lever arms;
    a pair of gauge wheel supporting arms each having one end connected to a second end of one of said turnbuckle subassemblies and to said gauge wheel axle and a second end pivotally connected to said framework; and
    means for rotating said transversely extending control member to concurrently rotate said bell crank lever arms from an over-the-road position in end-to-end alignment with the respective turnbuckle subassemblies to a plowing position in which said lever arms and turnbuckle subassemblies are angulated relative to each other.

12. In a chisel plow including a framework having a pair of blade-supporting frame bars angled to each other in a horizontal plane to define a V in configuration, and further having chisel blades mounted on said frame bars and projecting downwardly therefrom, the improvement which comprises:

a transversely extending frame bar at the forward side of said framework;

a towing tongue pivotally connected to the forward side of the framework for pivotation about a horizontal axis;

means for pivoting the tongue and framework relative to each other between a first position in which the framework is in coplanar alignment with the towing tongue, and other positions in which the framework is angulated with respect to the towing tongue;

gauge wheels pivotally mounted on opposite ends of said frame bar and movable with the framework in relation to the towing tongue;

an elongated, transversely extending control member mounted rotatably on said transversely extending frame bar for rotation about a horizontal axis extending transversely across the direction of travel of the plow when plowing;

crank means connected between said transversely extending control member and said gauge wheels for pivoting the gauge wheels on the framework when said transversely extending control member is rotated; and means for rotating said transversely extending control member independently of the angulation adjustment of said framework with respect to said towing tongue, whereby said gauge wheels may be independently adjusted with respect to said towing tongue to facilitate independent control of blade depth and blade earth penetration angle.

* * * * *